United States Patent [19]
Naji et al.

[11] Patent Number: 6,030,447
[45] Date of Patent: Feb. 29, 2000

[54] CEMENT FORMULATION

[75] Inventors: Basil Taha Naji, Parramatta; Steven Alfred Duselis, Kings Park; James Albert Gleeson, Hurstville; Danielle Simone Klimesch, Lakemba; Brian Patrick Sloane, Old Toongabbie; David Malcolm Stitt, Chatswood, all of Australia

[73] Assignee: James Hardie Research Pty. Limited, New South Wales, Australia

[21] Appl. No.: 08/910,466

[22] Filed: Jul. 25, 1997

Related U.S. Application Data

[63] Continuation of application No. 08/545,527, Oct. 19, 1995, abandoned.

[30] Foreign Application Priority Data

Aug. 25, 1995 [AU] Australia ................ PN 5040

[51] Int. Cl.$^7$ ................................... C04B 14/10
[52] U.S. Cl. .................. 106/718; 106/721; 106/737
[58] Field of Search ................... 501/141, 144; 106/699, 718, 721, 737, 803

[56] References Cited

U.S. PATENT DOCUMENTS

| | | | |
|---|---|---|---|
| 4,118,236 | 10/1978 | Erksine | 501/144 |
| 4,462,137 | 7/1984 | Heitzmann et al. | 106/624 |
| 4,482,649 | 11/1984 | Heitzmann et al. | 106/707 |
| 4,640,715 | 2/1987 | Heitzmann et al. | 106/706 |
| 4,642,137 | 2/1987 | Heitzmann et al. | 106/624 |
| 4,737,191 | 4/1988 | Meynardi | 106/805 |
| 4,793,861 | 12/1988 | Sohm | 106/706 |
| 4,906,408 | 3/1990 | Bouniol | 106/695 |
| 4,975,396 | 12/1990 | Thiery | 501/90 |
| 5,167,710 | 12/1992 | Leroux et al. | 106/718 |
| 5,378,279 | 1/1995 | Conroy | 106/720 |
| 5,531,824 | 7/1996 | Burkes et al. | 106/707 |
| 5,565,026 | 10/1996 | Hense et al. | 106/600 |
| 5,714,002 | 2/1998 | Styron | 106/705 |

FOREIGN PATENT DOCUMENTS

| | | |
|---|---|---|
| 0184477 | 5/1984 | European Pat. Off. . |
| 0184477 | 6/1986 | European Pat. Off. . |
| 0 428 431 | 5/1991 | European Pat. Off. . |
| 0428431 | 5/1991 | European Pat. Off. . |
| 2 248 246 | 5/1975 | France . |
| 2248246 | 5/1975 | France . |
| 2405908 | 5/1979 | France . |
| 4104919 | 8/1992 | Germany . |
| 607813 | 4/1978 | Japan . |
| 53050229 | 5/1978 | Japan . |
| 58045008 | 3/1983 | Japan . |
| 58059803 | 4/1983 | Japan . |
| 655678 | 10/1977 | U.S.S.R. . |
| 85331A/47 | 1/1978 | U.S.S.R. . |
| 27516B/14 | 4/1978 | U.S.S.R. . |
| 92327B/15 | 4/1979 | U.S.S.R. . |
| 85091806/15 | 9/1984 | U.S.S.R. . |
| 2 083 512 | 3/1982 | United Kingdom . |
| 2083512 | 3/1982 | United Kingdom . |
| WO9321126 | 10/1993 | WIPO . |

OTHER PUBLICATIONS

"Influence Explanation of Siliceous Materials Additive to Cement as Well as of Pastes Hydration and Their Treatment Temperature on the Lime Quantity Liberated by Rehydration", Zdenek Sauman, et al, 11 Cemento, vol. 3, (1978), pp. 343–350.

"Use of DTA to Determine the Effect of Mineralizers on the Cement–Quartz Hydrothermal Reactions, Part 2. Clay Addition", A. Ray, et al, Thermochimica Acta 250 (1995), pp. 189–195.

"Hydration of Cements Based on Metakaolin: Thermochemistry", P.S. de Silva, et al, Advances in Cement Research (1990), vol. 3, No. 12, Oct., pp. 167–177.

"Metakaoline Blended Cements: An Efficient Way to Improve GRC Durability and Ductility", J. Ambriose, et al, International Congress GRC/87, 6th Biennial Congress of the GRCA, Oct. 20–23, (1987), Edinburgh, Scotland, pp. 19–24.

"Influence explanation of Siliceous materials additive to Cement as Well as of Pastes Hydration and Their Treatment Temperature on the Lime Quality Liberated by Rehydration" Saumann et al. Res Inst Bldg. Mat'l Brno Czech 75(3), p 343–50, (1978).

Chemical Abstracts, vol. 109, No. 26, Dec. 26, 1988, Columbus, Ohio, Abstract No. 235933q, Shibuya Takemi, "Prevention of Alkali Aggregatefreactionusing Burn Montmorilonite" p. 316, SP000157943.

*Primary Examiner*—Paul Marcantoni
*Attorney, Agent, or Firm*—Weingarten, Schurgin, Gagnebin & Hayes LLP

[57] ABSTRACT

This invention relates to a formulation for preparing a dry formulation for preparing an autoclave cured cementitious product comprising:

a cementitious material;

a siliceous material; and a dehydroxylated clay mineral.

18 Claims, No Drawings

CEMENT FORMULATION

This application is a continuation of application Ser. No. 08/545,527, filed oct. 19, 1995 abandoned.

This invention relates to a formulation for preparing an autoclave cured cementitious material, to a method of preparing a cementitious product using the formulation and to a shaped article capable of being prepared therefrom.

Autoclave cured cerentitious materials are commonly used both with and without reinforcement fibres to manufacture many building products. Un-reinforced autoclave aerated concrete (AAC) building blocks and cellulose fibre reinforced concrete (FRC) flat or profiled sheets and FRC pipes are examples of such products.

The raw materials used for the manufacture of autoclave cured cementitious products are typically reinforcing fibre (if required), ground sand, cement and/or lime, water and minor additives. However, it has been difficult to date to obtain unpressed autoclave cured cementitious products that are as impermeable to water as post-pressed equivalents. Post-pressing occurs after formation of the product.

It would be desirable to obtain an autoclave cementitious product that has low water permeability.

According to a first aspect of the invention there is provided a dry formulation for preparing an autoclave cured cementitious product comprising:

a cementitious material;

a siliceous material; and a dehydroxylated clay mineral.

According to a second aspect of the invention there is provided an aqueous formulation for preparing an autoclave cured cementitious product comprising:

a cementitious material;

a siliceous material, a dehydroxylated clay mineral; and water.

Throughout this specification, unless indicated otherwise where there is reference to wt %, all values are with respect to the formulation on a dry materials weight basis prior to addition of water and processing.

The siliceous material is preferably present in an amount of from 10–80 wt %, more preferably 30–70 wt %, most preferably 40–65 wt %. Preferably the siliceous material is ground sand (also known as silica) or fine quartz. Preferably the siliceous material has an average particle size of 1–50 microns, more preferably 20–30 microns.

The cementitious material is preferably present in amount of from 10–80 wt %, more preferably 30–70 wt %, most preferably 35–50 wt %. Preferably the cementitious material is cement and/or lime and/or lime containing material and includes Portland cement, hydrated lime, lime or mixtures thereof. Preferably the cementitious material has an average particle size of 1–50 microns, more preferably 20–30 microns.

The dehydroxylated clay mineral can be dehydroxylated kaolin (also known as metakaolin), dehydroxylated bentonite, dehydroxylated montmorillonite, dehydroxylated illite, dehydroxylated muscovite or dehydroxylated phlogopite etc. Preferably the debydroxylated clay mineral is metakaolin. Metakaolin ($Al_2 O_3 2SiO_2$) is a reactive aluminium silicate pozzolan formed by thermal activation (dehydroxylation) of kaolin in the temperature range 450–800° C. The dehydroxylated clay mineral is preferably present in an amount of from 0.25–30 wt %, more preferably 1–25 wt %, most preferably 2–12 wt %. Preferably the dehydroxylated clay mineral has an average particle size of 1–50 microns, more preferably 4–8 microns. The dehydroxylated clay mineral may be in a pure or impure form and includes, impure natural clays containing dehydroxylated clay minerals together with other components. Suitable natural clays include tropical soils, and laterite soils. Also suitable are processed natural clays such as black colliery spoil and slate waste.

The formulations can include a fibrous material capable of producing a fibre reinforced product. Suitable fibrous materials include cellulose such as softwood and hardwood cellulose fibres, non wood cellulose fibres, asbestos, mineral wool, steel fibre, synthetic polymers such as polyamides, polyesters, polypropylene, polyacrylonitrile, polyacrylamide, viscose, nylon, PVC, PVA, rayon, glass, ceramic or carbon. Cellulose fibres produced by the Kraft process are preferred. Preferably the fibrous materials are present in a concentration of 0–25 wt %, more preferably 2–16 wt most preferably 5–12 wt %. When cellulose fibres are used, they are preferably refined to a degree of freeness of between 0 and 800 Canadian Standard Freeness (CSF), more preferably 200–500 CSF.

The formulations can contain 0–40 wt % of other additives such as fillers such as mineral oxides, hydroxides and clays, metal oxides and hydroxides, fire retardants such as magnesite, thickeners, silica fulme or amorphous silica, colorants, pigments, water sealing agents, water reducing agents, setting rate modifiers, hardeners. filtering aids, plasticisers, dispersants, foaming agents or flocculating agents, water-proofing agents, density modifiers or other processing aids.

According to a third aspect of the invention there is provided a method for forming an autoclave cured cementitious product comprising:

adding a cementitious material, a siliceous material, a dehydroxylated clay mineral and optionally other additives to water to form a slurry;

forming a green shaped article by dewatering the slurry;

optionally pressing the article; and curing the article in an autoclave.

Green shaped articles may be formed from the water borne slurry by any of a number of conventional processes such as the Hatschek sheet process, the Mazza pipe process, the Magnani sheet process, injection moulding, extrusion, hand lay-up, moulding, casting, filter pressing, flow on machine, roll forming, etc., with or without post-formation pressing. After forming, the green article is preferably precured for a short time, preferably 0 to 30 hours then cured by autoclaving preferably in a steam pressurised vessel preferably at 120 to 200° C. for 3 to 30 hours, most preferably less than 24 hours. The length of time and temperature chosen for curing is dependant on the formulation, the manufacturing process and the form of the article.

According to a fourth aspect of the invention there is provided a cementitious product comprising the autoclave cured reaction product of a dehydroxylated clay mineral, a cementitious material, a siliceous material and optionally other additives.

According to a fifth aspect of-the invention there is provided a cementitious product comprising the autoclave cured reaction product of a fibrous material, a dehydroxylated clay mineral, a cementitious material, a siliceous material and optionally other additives.

Preparing autoclave cured products by adding a dehyroxylated clay mineral to the formulation can improve the strength and toughness of the product and reduce water permeability and hygroscopic moisture movement.

The invention will now be described by way of preferred embodiments with reference to the following examples.

Throughout Examples 2 to 6 water permeability is determined by gluing a 1.2 m tall tube to the surface of a test specimen, filling water into the tube to a predetermined height and determining its time rate of fall compared to a control.

Carbonated moisture movements are determined after the articles (i.e. filter pads) have been subjected to carbon dioxide gas.

Flexural toughness is the total energy per unit volume absorbed by test specimens up to the point of maximum load.

EXAMPLE 1
Use of Metakaolin in a Non-reinforced Cement/silica Matrix

A bench scale experiment was performed. Standard un-reinforced cement/silica test cubes, bars and disks based on off-white cement, were prepared according to a conventional procedure (formulation 1) without post-pressing and used as a control. Two formulations in accordance with the invention were also prepared without post-pressing (formulations 2 and 3). In formulations 2 and 3 metakaolin was incorporated into the matrix as a replacement for some of the silica. Compositions and amounts of each formulation are shown in Table 1a. The cement was an off-white cement of greater reactivity than ordinary grey general purpose cement. Specimens were all autoclave cured for eight hours at 180° C.

TABLE 1a

| Formulation | Off-white Cement | Silica | Metakaolin |
|---|---|---|---|
| 1 | 40.0 wt % | 60.0 wt % | 0.0 wt % |
| 2 | 40.0 wt % | 58.5 wt % | 1.5 wt % |
| 3 | 40.0 wt % | 57.0 wt % | 3.0 wt % |

TABLE 1b

| Formulation | 1 | 2 | 3 |
|---|---|---|---|
| Level of metakaolin addition, wt % | 0 | 1.5 | 3.0 |
| Cube compressive strength, MPa | 110 | 99 | 91 |
| Bar un-carbonated moisture movement, % | 0.25 | 0.21 | 0.21 |
| Disk drying mass loss, % per hour | 6.2 | 5.3 | 4.8 |

The average measured physical properties and drying rates are shown in Table 1b. Drying rate was determined by saturating disks under water until they reached constant mass, drying them in a forced draft oven at 55° C. for one hour and determining the mass (of water) lost by drying.

It can be seen from Table 1b that matrices formulated according to the invention (formulations 2 and 3) exhibit lower drying rates, i.e. high resistance to water perneation. Further the un-carbonated moisture movements of the inventive formulations are reduced. All of the observed compressive strengths are well above the 85MPa considered reasonable for actual product performance.

EXAMPLE 2
Use of Metakaolin in Cellulose Fibre-Reinforced Concrete Filter Pads A bench scale experiment was conducted. Filter pads of cellulose fibre-reinforced concrete with a 40:60 (weight basis) cement:silica ratio were prepared without post-pressing according to a conventional procedure. Formulation 4 was used as a control. Two formulations in accordance with the invention were then prepared with metakaolin incorporated into the matrix (formulations 5 and 6). The composition and amounts of each formulation are shown in Table 2a. Specimens were all autoclave cured for eight hours at 180° C.

TABLE 2a

| Formulation | Cellulose | Cement | Silica | Metakaolin | Fire Retardant |
|---|---|---|---|---|---|
| 4 | 8.0 wt % | 35.2 wt % | 52.8 wt % | 0 wt % | 4.0 wt % |
| 5 | 8.0 wt % | 36.8 wt % | 53.2 wt % | 2.0 wt % | 0 wt % |
| 6 | 8.0 wt % | 36.8 wt % | 51.2 wt % | 4.0 wt % | 0 wt % |

TABLE 2b

| Formulation | 4 | 5 | 6 |
|---|---|---|---|
| Cellulose freeness, CSF | 450 | 450 | 450 |
| Level of metakaolin addition, wt % | 0 | 2.0 | 4.0 |
| Saturated flexural strength, MPa | 11.8 | 11.9 | 12.6 |
| Saturated Young's modulus, GPa | 2.9 | 2.6 | 3.4 |
| Saturated flexural toughness, KJ/m3 | 11.0 | 11.5 | 11.4 |
| Uncarbonated moisture movement % | 0.17 | 0.19 | 0.19 |
| Carbonated moisture movement, % | 0.43 | 0.45 | 0.47 |
| Water permeation rate, ml/hr | 1.00 | 0.50 | 0.38 |
| Oven dry density, kg/m3 | 1270 | 1270 | 1270 |

The resulting average measured physical properties and water permeability rates (using a 1m high water column) are shown in table 2b. Filter pads formulated according to the invention (formulations 5 and 6) exhibit improved water permeation resistance without adverse effects on other physical properties.

EXAMPLE 3
Effect of Cellulose Freeness on Water Permeability Reduction Effect A bench scale experiment was conducted. Formulations were used containing cellulose having two different pulp freeness levels to make filter pads without post pressing via a conventional procedure. Formulations 7 and 9 were used as a control. Formulations 8 and 10 were made in accordance with the present invention and contained 2 wt % of metakaolin. Compositions and amounts of each formulation are shown in table 3a. Specimens were all autoclave cured for eight hours at 180° C.

TABLE 3a

| Formulation | Cellulose | Cement | Silica | Metakaolin | Fire Retardant |
|---|---|---|---|---|---|
| 7 | 8.0 wt % | 35.2 wt % | 52.8 wt % | 0 wt % | 4.0 wt % |
| 8 | 8.0 wt % | 36.8 wt % | 53.2 wt % | 2.0 wt % | 0 wt % |
| 9 | 8.0 wt % | 35.2 wt % | 52.8 wt % | 0 wt % | 4.0 wt % |
| 10 | 8.0 wt % | 36.8 wt % | 53.2 wt % | 2.0 wt % | 0 wt % |

TABLE 3b

| Formulation | 7 | 8 | 9 | 10 |
|---|---|---|---|---|
| Cellulose freeness, CSF | 450 | 450 | 141 | 141 |
| Level of metakaolin addition, wt % | 0 | 2.0 | 0 | 2.0 |
| Saturated flexural strength, MPa | 11.8 | 11.9 | 10.5 | 11.3 |
| Saturated Young's modulus, GPa | 2.9 | 2.6 | 3.5 | 4.3 |
| Saturated flexural toughness, KJ/m3 | 11.0 | 11.5 | 5.1 | 4.9 |
| Uncarbonated moisture movement % | 0.17 | 0.19 | 0.18 | 0.22 |
| Carbonated moisture movement, % | 0.43 | 0.45 | 0.42 | 0.36 |
| Water permeation rate, ml/hr | 1.00 | 0.50 | 0.71 | 0.47 |
| Oven dry density, kg/m3 | 1270 | 1270 | 1270 | 1250 |

The physical properties and water permeation rates are shown in table 3b. Comparison of the results for formulations 7, 8, 9 and 10 show that filter pads formulated according to the invention (formulations 8 and 10) exhibit improved water permeation resistance for both pulp freeness levels investigated.

EXAMPLE 4

Effect of Method of Metakaolin Addition on Permeability

A bench scale experiment was conducted. Filter pads were prepared without post-pressing according to a conventional procedure. Formulations 11 and 13 were used as controls. Formulations 12 and 14 in accordance with the invention contained metakaolin at a level of 2.0 wt % using two different addition methods, namely (i) by addition to the matrix mix (formulation 12) and (ii) by addition to the cellulose fibre prior to batching of solids (formulation 14) so that the fibres were effectively pre-coated with the metakaolin. Compositions and amount for each formulation are shown in table 4a. Specimens were all autoclave cured for eight hours at 180° C.

TABLE 4a

| Formulation | Cellulose | Cement | Silica | Metakaolin | Fire Retardant |
|---|---|---|---|---|---|
| 11 | 8.0 wt % | 35.2 wt % | 52.8 wt % | 0 wt % | 4.0 wt % |
| 12 | 8.0 wt % | 36.8 wt % | 53.2 wt % | 2.0 wt % | 0 wt % |
| 13 | 8.0 wt % | 35.2 wt % | 52.8 wt % | 0 wt % | 4.0 wt % |
| 14 | 8.0 wt % | 36.8 wt % | 53.2 wt % | 2.0 wt % | 0 wt % |

TABLE 4b

| Formulation | 11 | 12 | 13 | 14 |
|---|---|---|---|---|
| Cellulose freeness, CSF | 450 | 450 | 390 | 390 |
| Level of metakaolin addition, wt % | — | 2 | — | 2 |
| Method of metakaolin addition | — | Mix addition | — | Fiber coated |
| Saturated flexural strength, MPa | 11.8 | 11.9 | 11.1 | 12.5 |
| Saturated Young's modulus, GPa | 2.9 | 2.6 | 3.6 | 3.9 |
| Saturated flexural toughness, KJ/m3 | 11.0 | 11.5 | 6.3 | 6.6 |
| Uncarbonated moisture movement % | 0.17 | 0.19 | 0.15 | 0.19 |
| Carbonated moisture movement, % | 0.43 | 0.45 | 0.43 | 0.43 |
| Water permeation rate, ml/hr | 1.00 | 0.50 | 1.00 | 0.43 |
| Oven dry density, kg/m3 | 1270 | 1270 | 1330 | 1270 |

The physical properties and permeability rates are given in table 4b, which shows filter pads formulated according to the invention (formulations 12 and 14) exhibit improved water permeation resistance for both methods of metakaolin addition.

EXAMPLE 5

Effect of Metakaolin Addition on Toughness and Moisture Movements

A bench experiment was conducted. Filter pads were prepared without post-pressing using a conventional procedure. Formulation 15 was used as a control. Formulations 16 and 17 were prepared in accordance with the invention by incorporating metakaolin into the matrix by replacement of silica whilst maintaining the amount of cement. The silica:cement weight ratio for the control was 50:50. Compositions and amounts of each of the formulations are shown in Table 5a. Specimens were all autoclave cured for eight hours at 180° C.

TABLE 5a

| Formulation | Cellulose | Cement | Silica | Metakaolin |
|---|---|---|---|---|
| 15 | 8.0 wt % | 46.0 wt % | 46.0 wt % | 0 wt % |
| 16 | 8.0 wt % | 46.0 wt % | 44.0 wt % | 2.0 wt % |
| 17 | 8.0 wt % | 46.0 wt % | 36.0 wt % | 10.0 wt % |

TABLE 5b

| Formulation | 15 | 16 | 17 |
|---|---|---|---|
| Cellulose freeness, CSF | 465 | 357 | 465 |
| Level of metakaolin addition, wt % | 0% | 2.0% | 10.0% |
| Saturated flexural strength, MPa | 14.6 | 13.8 | 12.2 |
| Saturated Young's modulus, GPa | 3.4 | 3.5 | 3.1 |
| Saturated flexural toughness, KJ/m3 | 8.8 | 7.8 | 11.7 |
| Uncarbonated moisture movement % | 0.20 | 0.20 | 0.18 |
| Carbonated moisture movement, % | 0.52 | 0.49 | 0.46 |
| Water permeation rate, ml/hr | 0.51 | 0.41 | 0.23 |
| Oven dry density, kg/m3 | 1300 | 1320 | 1290 |

The physical properties and resistance to permeation values are shown in table 5b. Comparison of the results of formulations 15, 16 and 17 show that filter pads formulated according to the invention (formulations 16 and 17) exhibit improved water permeation resistance. At a 10 wt % level of metakaolin addition (formulation 17) the saturated flexural toughness is significantly improved and post- and pre-carbonation moisture movement is reduced.

EXAMPLE 6

Effect of Metakaolin and Lime Additions on Toughness and Moisture Movement

A bench experiment was conducted. Filter pads were prepared via a conventional procedure without post-pressing. Formulation 18 was used as a control. Formulations 19 and 20 were prepared in accordance with the present invention with metakaolin and hydrated lime in the relative weight proportions of 1:2 were incorporated into the matrix. In both the control and inventive formulations, a cement:silica ratio of 50:50 was maintained. Compositions and amounts for each formulation are given in table 6a. Specimens were all autoclave cured for eight hours at 180° C.

TABLE 6a

| Formulation | Cellulose | Cement | Silica | Metakaolin | Lime |
|---|---|---|---|---|---|
| 18 | 8.0 wt % | 46.0 wt % | 46.0 wt % | 0 wt % | 0 wt % |
| 19 | 8.0 wt % | 38.5 wt % | 38.5 wt % | 5.0 wt % | 10.0 wt % |
| 20 | 8.0 wt % | 34.8 wt % | 34.8 wt % | 7.5 wt % | 15.0 wt % |

TABLE 6b

| Formulation | 18 | 19 | 20 |
|---|---|---|---|
| Cellulose freeness, CSF | 266 | 266 | 266 |
| Level of metakaolin addition, wt % | 0 | 5.0 | 7.5 |
| Saturated flexural strength, MPa | 13.5 | 11.6 | 9.6 |
| Saturated Young's modulus, GPa | 4.25 | 3.0 | 2.5 |
| Saturated flexural toughness, KJ/m3 | 5.2 | 9.6 | 9.2 |
| Uncarbonated moisture movement % | 0.21 | 0.18 | 0.15 |
| Carbonated moisture movement, % | 0.45 | 0.42 | 0.40 |
| Water permeation rate, ml/hr | 0.21 | 0.21 | 0.30 |
| Oven dry density, kg/m3 | 1310 | 1270 | 1240 |

The physical properties and resistance to permeation values are shown in table 6b. It is evident from the table that filter pads formulated according to the invention (formulations 19 and 20) exhibit reduced post- and pre-carbonation moisture movement. Further the flexural toughness is also improved. This is associated with a visible decrease in the oven dry density and a less than expected decrease in flexural strength and Young's modulus.

EXAMPLE 7

Effect of Metakaolin Addition on Low Density Composites

A bench scale experiment was conducted. Filter pads all incorporating a density lowering, autoclave stable modifier additive were prepared via a conventional procedure without post-pressing. Formulations 21 and 23 were used as a control. Formulations 22 and 24 were prepared in accordance with the invention with metakaolin incorporated into the matrix by replacement of silica and cement while maintaining the cement:silica ratio Compositions and amounts of each of the formulations is shown in table 7a. Specimens were all autoclave cured for eight hours at 180° C.

TABLE 7a

| Formulation | Cellulose | Cement | Silica | Metakaolin | Additive |
|---|---|---|---|---|---|
| 21 | 11.3 wt % | 31.5 wt % | 47.3 wt % | 0 wt % | 10.0 wt % |
| 22 | 11.3 wt % | 30.4 wt % | 45.7 wt % | 2.7 wt % | 10.0 wt % |
| 23 | 11.3 wt % | 27.5 wt % | 41.3 wt % | 0 wt % | 20.0 wt % |
| 24 | 11.3 wt % | 25.3 wt % | 38.0 wt % | 5.4 wt % | 20.0 wt % |

TABLE 7b

| Formulation | 21 | 22 | 23 | 24 |
|---|---|---|---|---|
| Cellulose freeness, CSF | 380 | 380 | 380 | 380 |
| Level of metakaolin addition, wt % | 0 | 2.7 | 0 | 5.4 |
| Saturated flexural strength, MPa | 6.7 | 6.1 | 4.8 | 5.7 |
| Saturated flexural toughness, KJ/m3 | 10.5 | 12.6 | 9.6 | 10.2 |
| Uncarbonated moistute movement % | 0.25 | 0.19 | 0.26 | 0.23 |
| Carbonated moisture movement, % | 0.40 | 0.44 | 0.45 | 0.64 |
| Carbonation shrinkage, % | 0.20 | 0.15 | 0.14 | 0.12 |
| Permeability factor | 241 | 138 | 138 | 47 |
| Density, kg/m3 | 884 | 1016 | 913 | 923 |

The physical properties and ;Usability factor values are shown in table 7b. The permeability factor is a proportionate measure of the rate at which water under pressure may be forced through a specimen in a permeability testing cell. Lower values indicate lower water permeability. It is evident from the table that filter pads formulated according to the invention (formulations 22 and 24) exhibit reduced un-carbonated moisture movement, reduced carbonation shrinkage values and reduced permeability to water. Further with metakaolin addition, the flexural toughness is improved (formulation 22) and the flexural strength is increased (formulation 24).

The values for water permeability reduction evidenced by the un-pressed products using formulations in accordance with the invention as evidenced by the examples are values which would normally only be obtained by an additional step of post-pressing products with the attendant increase in density. It is believed that post-pressing will further enhance the observed reduction in water permeability.

Further from the examples it can be seen that metakaolin addition results in reduced un-carbonated and post-carbonation moisture movements of autoclave composites and in some cases to reduced carbonation shrinkage. Flexural toughness (the energy required to fracture a flexural test specimen) of the autoclave composites is also improved when metakaolin is present as an additive in the matrix forming material.

The formulations of the present invention are suitable for the production of autoclave cured cementitious products for both internal and external applications.

Although the invention has been described with reference only to selected examples, it will be appreciated by those skilled in the art that the invention may be embodied in many other forms.

We claim:

1. An autoclaved product having about 25–75% reduction in water permeability consisting essentially of:

Portland cement;

a crystalline siliceous material; and a dehydroxylated clay mineral which is different from said crystalline siliceous material.

2. A formulation according to claim 1 wherein the siliceous material is present in an amount of from 10 to 80 wt. % based on the total weight of the dry formulation.

3. A formulation according to claim 1 wherein the siliceous material is ground sand or fine quartz.

4. A formulation according to claim 1 wherein the siliceous material has an average particle size of 1 to 50 microns.

5. A formulation according to claim 1 wherein the cementitious material is present in an amount of from 10 to 80 wt. % based on the total weight of the dry formulation.

6. A formulation according to claim 1 wherein the cementitious material is selected from the group consisting of cement, lime, lime containing material, and mixtures thereof.

7. A formulation according to claim 1 wherein the cementitious material has an average particle size of from 1 to 50 microns.

8. A formulation according to claim 1 wherein the dehydroxylated clay mineral is dehydroxylated kaolin; dehydroxylated bentonite, dehydroxylated montmorrilonite, dehydroxylated muscovite or dehydroxylated phlogopite.

9. A formulation according to claim 8 wherein the dehydroxylated clay mineral is dehydroxylated kaolin.

10. A formulation according to claim 1 wherein the dehydroxylated clay mineral is present in an amount from 0.25 to 30 wt. % based on the total weight of the dry formulation.

11. A formulation according to claim 1 wherein the dehydroxylated clay mineral has an average particle size of 1 to 50 microns.

12. A formulation according to claim 1 further comprising a fibrous material.

13. A formulation according to claim 12 wherein the fibrous material is selected from cellulose, asbestos, mineral wool, steel fibre, synthetic polymers, glass, ceramic or carbon.

14. A formulation according to claim 13 wherein the fibrous material is cellulose having a degree of freeness of between 0 and 800 CSF.

15. A formulation according to claim 12 where the fibrous material is present in an amount up to 25 wt. % based on the total weight of the dry formulation.

16. A formulation according to claim 1 further consisting essentially of at least one other additive selected from the group consisting of mineral oxides, mineral hydroxides, mineral clays, fire retardants, thickeners, silica fume, amorphous silica, colorants, water sealing agents, water reducing agents, setting rate modifiers, plasticizers, dispersants, foaming agents, flocculating agents, and water-proofing agents.

17. A cementitious product comprising the autoclave cured reaction product of a composition consisting essentially of dehydroxylated clay mineral, Portland cement and a crystalline siliceous material which is different from said dehydroxylated clay mineral.

18. A cementitious product comprising the autoclave reaction product of a composition consisting essentially of fibrous material, a dehydroxylated clay mineral, Portland cement, and a crystalline siliceous material which is different from said dehydroxylated clay mineral.

* * * * *

UNITED STATES PATENT AND TRADEMARK OFFICE
CERTIFICATE OF CORRECTION

PATENT NO.    : 6,030,447
DATED         : February 29, 2000
INVENTOR(S)   : Basil Taha Naji et al.

It is certified that error appears in the above-identified patent and that said Letters Patent is hereby corrected as shown below:

Column 1,
Line 4, "oct." should read -- Oct. --;
Line 9, "cerentitious" should read -- cementitious --;
Line 58, "debydroxylated" should read -- dehydroxylated --;

Column 2,
Line 17, "2-16 wt" should read -- 2-16 wt% --;
Line 58, "of-the" should read -- of the --;

Column 3,
Line 52, "perneation" should read -- permeation --;

Column 6,
Line 27, "rnetakaolin" should read -- metakaolin --;

Column 7, Table 7b,
Line 40, "moistute" should read -- moisture --;
Line 45, ";Usability" should read -- permeability --;

Column 8, claim 5,
Lines 28-29, "cementitious material" should read -- Portland cement --;

Column 8,
Cancel claim 6; and

Column 8, claim 7,
Lines 35-36, "cementitious material" should read -- Portland cement --.

Signed and Sealed this

Ninth Day of April, 2002

Attest:

JAMES E. ROGAN
Attesting Officer    Director of the United States Patent and Trademark Office